(12) United States Patent
Gierer

(10) Patent No.: US 7,374,594 B2
(45) Date of Patent: *May 20, 2008

(54) FILTER AND SYSTEM FOR IMPROVED SEALING AND EASE OF ATTACHMENT ON A VACUUM CLEANER

(75) Inventor: Joseph T. Gierer, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/561,561

(22) Filed: Nov. 20, 2006

(65) Prior Publication Data

US 2007/0113526 A1    May 24, 2007

Related U.S. Application Data

(60) Provisional application No. 60/739,651, filed on Nov. 23, 2005.

(51) Int. Cl.
*B01D 45/00* (2006.01)

(52) U.S. Cl. .................................................. 55/467

(58) Field of Classification Search ................ 55/480, 55/490, 492, 493, 498, 502, 507, DIG. 3; 95/273
See application file for complete search history.

(56) References Cited

U.S. PATENT DOCUMENTS

| | | | |
|---|---|---|---|
| 3,909,219 A * | 9/1975 | Fromknecht | ................ 96/406 |
| 4,797,072 A | 1/1989 | Berfield et al. | |
| 4,906,265 A | 3/1990 | Berfield | |
| 5,404,614 A | 4/1995 | Stephens | |
| 5,455,983 A | 10/1995 | Crouser et al. | |
| 5,606,769 A | 3/1997 | Tomasiak et al. | |
| 5,660,493 A * | 8/1997 | Stephens | .................... 403/348 |
| 5,733,351 A * | 3/1998 | Hult et al. | .................... 55/486 |
| 5,954,863 A | 9/1999 | Loveless et al. | |
| 5,964,909 A * | 10/1999 | Brunner | ........................ 55/377 |
| 6,829,804 B2 * | 12/2004 | Sepke | ........................ 15/347 |
| 6,991,667 B2 * | 1/2006 | Yang et al. | .................... 55/429 |

* cited by examiner

*Primary Examiner*—Duane Smith
*Assistant Examiner*—Sonji Turner
(74) *Attorney, Agent, or Firm*—Locke Lord Bissell & Liddell LLP

(57) ABSTRACT

The disclosure provides a system for mounting and sealing a filter in a vacuum cleaner, such as a wet and dry vacuum cleaner, that concentrates compressive sealing forces on a specific, relatively thin seal portion rather than the filter body as a whole. The concentrated compressive stress provides a well-defined region to consistently provide a sealing engagement. A portion of the seal is positioned into an undercut portion of a mounting assembly and is compressed or "pinched" between opposing surfaces to cause the sealing. Further, one or more of the surfaces are movable to compress the seal portion therebetween by actuation of a rotatable filter clamp engageable with a cam. The filter clamp translates toward the seal portion as the filter clamp is rotated along a sloped surface of the cam to engage and clamp the seal portion between the surfaces.

16 Claims, 8 Drawing Sheets

FILTER AND SYSTEM FOR IMPROVED SEALING AND EASE OF ATTACHMENT ON A VACUUM CLEANER

CROSS REFERENCE TO RELATED APPLICATIONS

This application claims the benefit of U.S. Provisional Appl. No. 60/739,651, filed Nov. 23, 2005, the contents of which are hereby incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure relates to the field of vacuum cleaners. More specifically, the disclosure relates to filters for vacuum cleaners.

2. Description of the Related Art

Vacuum cleaners are notoriously dusty and dirty, requiring some method to separate the dust and the dirt from the exhaust air. Hence, filters are commonly used to perform this separation function. There often is a need to remove and re-attach the filter, for example, when cleaning the filter or replacing it with a new filter. With the type of vacuum cleaners known as "wet/dry" vacuum cleaners, the filter is often also removed when the vacuum cleaner is suctioning liquids. Thus, special structures accompany a typical wet/dry vacuum cleaner to accommodate removing and replacing the filter.

Typically, a suction system with a motor creates the vacuum and is mounted in a lid that is removably attached to a collection drum for receiving the vacuumed materials. A portion of the lid, herein termed a mounting assembly, extends at least partially downward into the drum and mounts a filter support assembly, such as commonly known as a "cage," that generally covers a vacuum intake to the suction assembly in the lid. The filter support assembly is composed of a series of ribs with a large percentage of open surface area. The ribs support the filter and prevent radially inward collapse of the filter during operation. The lid suctions external air or water through a hose into an opening in the drum or lid, so that water or dirt is deposited into the drum. Remaining material, mainly air, then flows radially inward through the filter for removal of dirt and debris and continues through the filter support assembly into a suction impeller in the lid, and then is exhausted from the vacuum cleaner.

In many such systems, the entire filter body is attached to the mounting assembly by a mounting flange removably attached to the mounting assembly. The filter is inserted over the cage, and a mounting flange of rigid material, such as plastic, is attached to the cage or mounting assembly and used to compress or "sandwich" the filter between the flange and the mounting assembly. The compressive force on the entire filter body and its filter element is the primary force used to seal the filter to the vacuum cleaner and prevent unwanted leakage into the impeller.

Experience has shown that operators have difficulty determining how much compressive force to use on the filter body, because such installation includes compressing the filter element as well. At times, operators use too little force and allow leakage of fine dust, resulting in wear on the internal vacuum motor, impeller, and other internal structures. At other times, operators apply too much force and crush the filter or strip the attachment threads, causing repair or replacement. Further, the compressive force can vary, depending on whether the filter media has been exposed to moisture as is typical in a wet/dry vacuum cleaner.

Therefore, there remains a need for an improved filter design and system for mounting and sealing the filter in such a vacuum cleaner.

BRIEF SUMMARY OF THE INVENTION

The disclosure provides a system for mounting and sealing a filter in a vacuum cleaner, such as a wet and dry vacuum cleaner, that concentrates compressive sealing forces on a specific, relatively thin seal portion rather than the filter body as a whole. The concentrated compressive stress provides a well-defined region to consistently provide a sealing engagement. A portion of the seal is positioned into an undercut portion of a mounting assembly and is compressed or "pinched" between opposing surfaces to cause the sealing. Further, one or more of the surfaces are movable to compress the seal portion therebetween by actuation of a rotatable filter clamp engageable with a cam. The filter clamp translates toward the seal portion as the filter clamp is rotated along a sloped surface of the cam to engage and clamp the seal portion between the surfaces.

The disclosure provides a vacuum cleaner system, comprising: a mounting assembly of a vacuum cleaner having a first cross sectional dimension and having an undercut portion of less cross sectional dimension that the first cross sectional dimension; a filter support assembly adapted to be fixedly coupled to the mounting assembly; and a filter having a filter element and a lateral seal portion coupled to the filter element, the filter being removably coupled around at least a portion of the filter support assembly, and the lateral seal portion being oriented radially inward toward a longitudinal axis of the filter, the lateral seal portion at least partially extending into the undercut portion of the mounting assembly, the filter support assembly, or a combination thereof, the lateral seal portion being adapted to be compressed to seal the filter to the mounting assembly.

The disclosure also provides a vacuum cleaner system, comprising: a mounting assembly having a cam with a sloped surface; a rotatable filter clamp coupled to the mounting assembly and adapted to engage the cam so that rotation of the filter clamp changes elevation of the filter clamp in conjunction with the sloped surface; and a filter coupled to the mounting system and adapted to seal to the mounting system by the rotation of the filter clamp and corresponding change in elevation of the clamp.

The disclosure further provides a method of sealing a filter to a vacuum cleaner, the vacuum cleaning having a mounting assembly with a first cross sectional dimension and an undercut portion of less cross sectional dimension that the first cross sectional dimension, and a filter support assembly for supporting the filter, comprising: placing the filter over the filter support assembly so that a lateral seal portion of the filter engages the undercut portion, the filter support assembly, or a combination thereof; and rotating a filter clamp coupled to the mounting assembly along a cam surface to change the elevation of the filter clamp in a direction toward the lateral seal portion and compress the lateral seal portion disposed in the undercut portion.

The disclosure further provides a filter for a wet and dry vacuum cleaner comprising: a filter element having an opening on at least one end about a longitudinal axis of the filter; a seal coupled to the filter element, the seal formed on the end with said opening, the seal comprising a longitudinal seal portion and lateral seal portion, the longitudinal seal portion protruding in a longitudinal direction from the filter element; the lateral seal portion fixedly attached to the longitudinal seal portion, the lateral seal being oriented radially inward toward the longitudinal axis and having a minimum diameter that is less than the diameter of the filter element, and the lateral seal portion being adapted to be compressed and seal the filter to the vacuum cleaner.

BRIEF DESCRIPTION OF THE SEVERAL VIEWS OF THE DRAWINGS

A more particular description, briefly summarized above, may be had by reference to the embodiments illustrated in the appended drawings, forming part of the present specification and described herein. It is to be noted, however, that the appended drawings illustrate only some embodiments described herein and are therefore not to be considered limiting of the disclosure's scope, in that there can be other equally effective embodiments.

DETAILED DESCRIPTION

Figure 1:
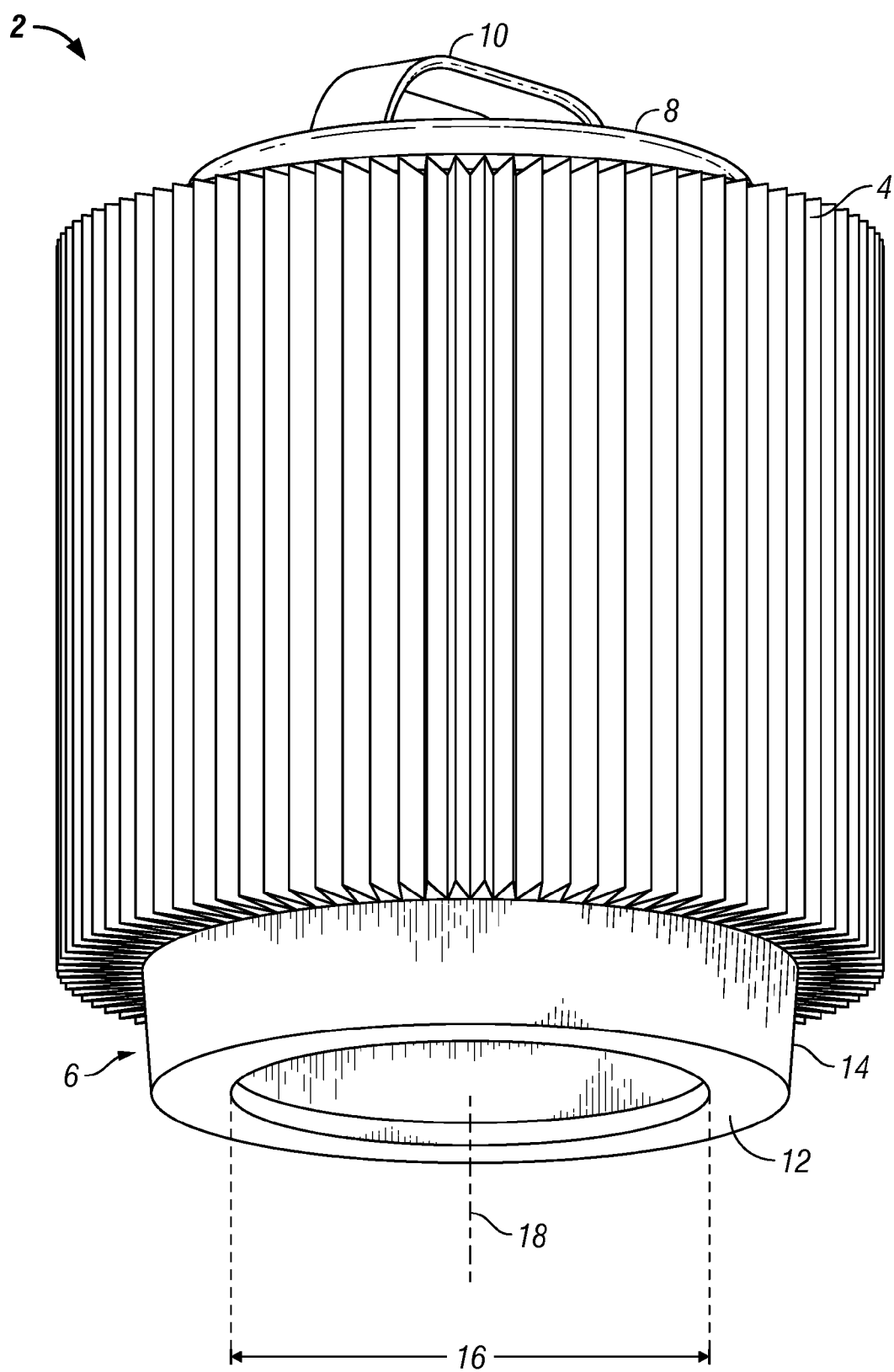
FIG. 1 is a perspective schematic view of an exemplary filter of the present disclosure.
Figure 2:
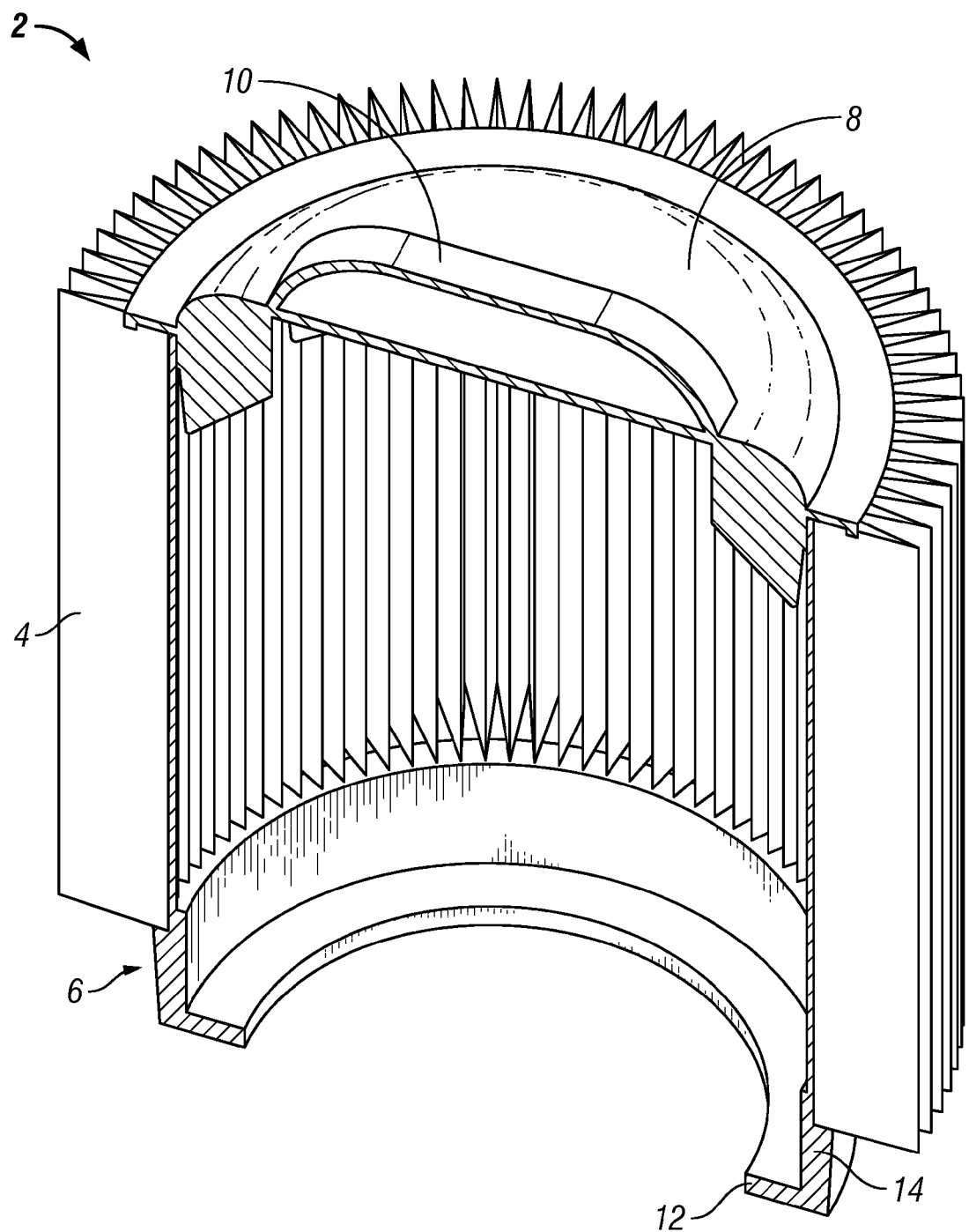
FIG. 2 is a perspective cross sectional schematic view of the exemplary filter, showing the filter seals, filter element, and cap.

FIG. 1 is a perspective schematic view of an exemplary filter of the present disclosure. FIG. 2 is a perspective cross sectional schematic view of the exemplary filter, showing the filter seals, filter element, and cap. The figures will be described in conjunction with each other. The filter 2 includes a filter element 4 having a seal 6 disposed on a lower end (relative to the figure orientation) and a filter cap 8 disposed on an upper end distal from the seal 6. The cap 8 can include a handle 10 for convenience in handling the filter. The components are disposed along a longitudinal axis 18. The filter element is generally porous material, such as cloth or paper, and can be reinforced with metal or plastic mesh. The filter seal 6 is generally formed from a non-porous material to reduce leakage therethrough and is sealed at the interface of the filter element. Advantageously, the seal can be made of a variety of flexible elastomeric materials that can be stretched and compressed and formed to various shapes, known to those with ordinary skill in the art. It is to be understood that the filter shape and configuration can vary within the scope of the claims herein with the primary goal of sealing the filter to the vacuum cleaner so as to inhibit undesired flow through the vacuum cleaner to which the filter is attached.

The filter seal 6 can include a lateral seal portion 12 and a longitudinal seal portion 14 coupled thereto. The lateral seal portion 12 extends radially inward toward the longitudinal axis 18 and seals with a filter support assembly, shown in more detail in FIG. 7 described below. The lateral seal portion has a thickness and composition sufficient to be compressed between two adjacent surfaces, described below, and maintain resiliency upon release. Generally, the lateral seal portion 12 is sized smaller across its cross-sectional dimension 16 than a corresponding cross-sectional dimension of the filter support assembly, so that the lateral seal portion is stretched over the relevant filter support assembly section and then resiliently contracts after encompassing the filter support assembly.

The longitudinal seal portion 14 can provide additional flexibility by providing a flexible moment arm for movement of the lateral seal portion 12 as it is stretched over the filter support assembly into position. The longitudinal seal portion 14 can be formed with the lateral seal portion 12 to form a unitary "L" shaped member. Still further, some embodiments can include a centering flange (not shown) coupled to the filter seal 6, such as to the lateral seal portion 12 or the longitudinal seal portion 14, to form a "T" shaped member. The centering flange can be useful in initial alignments of the filter to the filter support assembly, or alignment of other members to the filter.

While the filter seal 6 and other components are described in terms of various members, it is understood that such description is for convenience of the reader in identifying different portions, because one or more of the members can be integrally formed, in keeping with the definition of "coupling" herein. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally. Further, the term "end" is used broadly and generally includes the end of the effective filter used for filtering a media passing therethrough for purposes for which the filter was intended.

Figure 3:
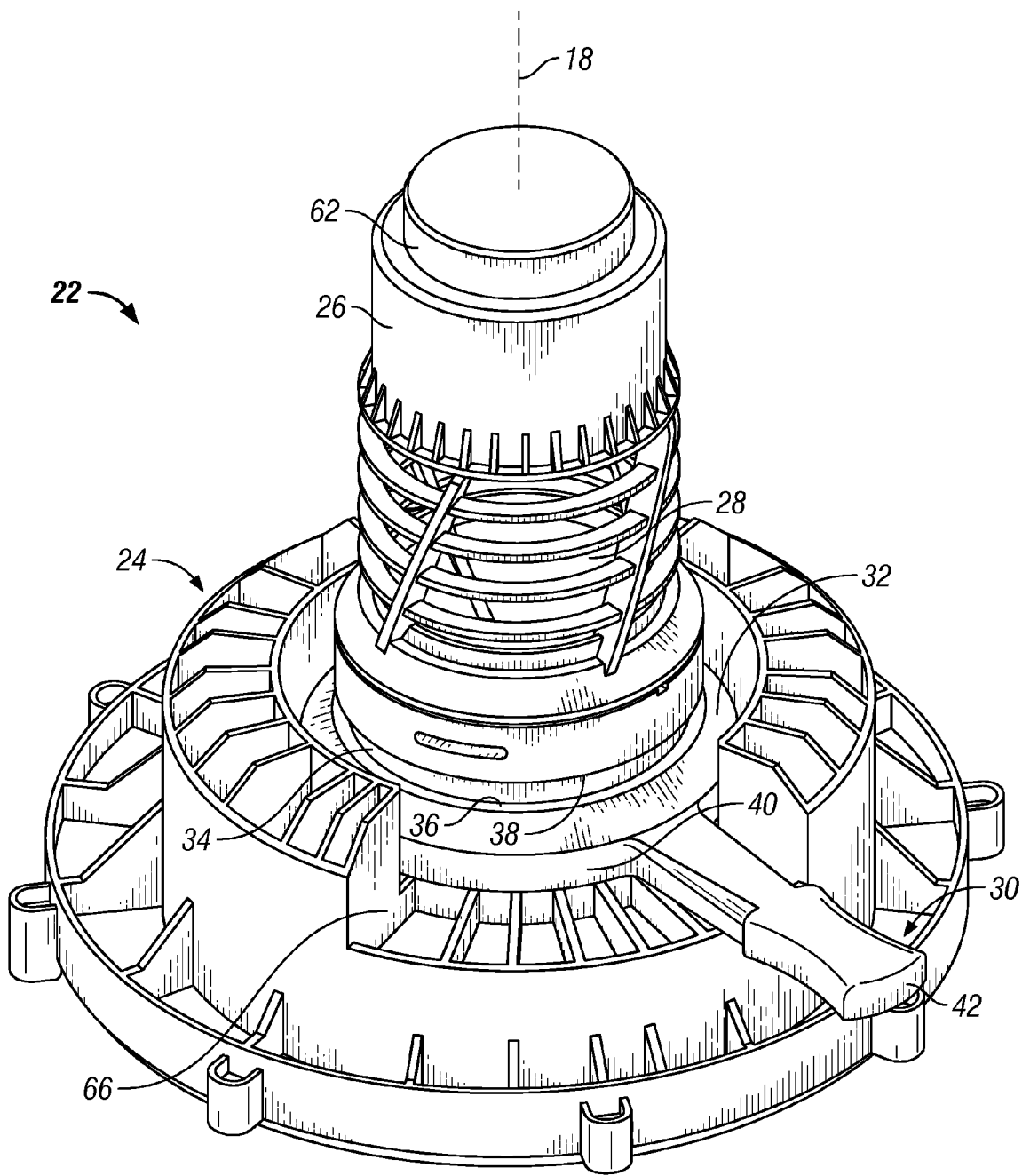
FIG. 3 is a perspective schematic view of an exemplary mounting assembly of the vacuum cleaner in a first position, having a filter support assembly upon which the filter is mounted.
Figure 4:
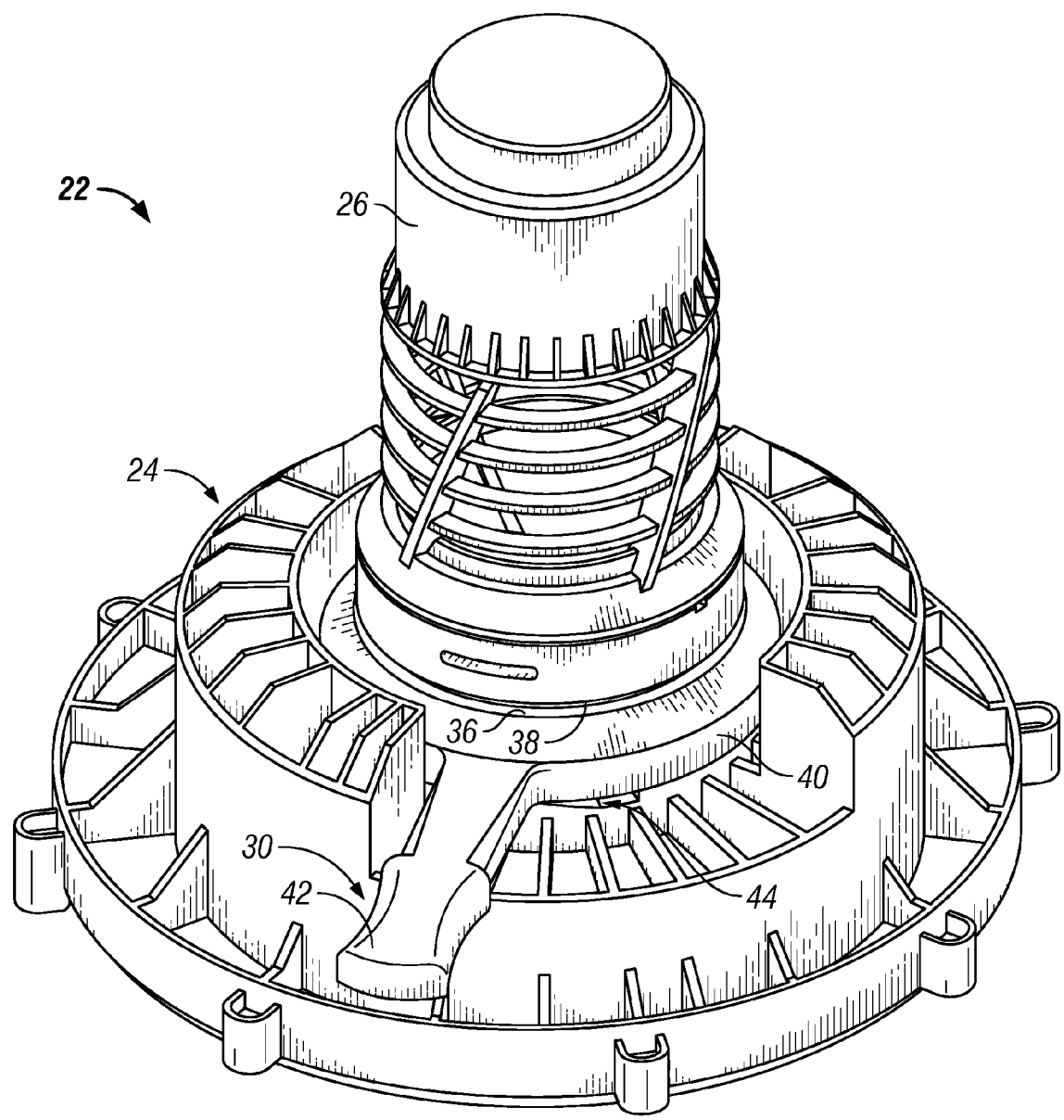
FIG. 4 is a perspective schematic view of an exemplary mounting assembly of the vacuum cleaner in a second position.

FIG. 3 is a perspective schematic view of an exemplary mounting assembly of the vacuum cleaner in a first position, having a filter support assembly upon which the filter is mounted. FIG. 4 is a perspective schematic view of an exemplary mounting assembly of the vacuum cleaner in a second position. The figures will be described in conjunction with each other.

The system 22 includes an exemplary mounting assembly 24 of the vacuum cleaner having a filter support assembly 26 upon which the filter 2 is mounted. In at least some embodiments, the mounting assembly is coupled to a lid of the vacuum cleaner. The system 22 can include other components of a vacuum cleaner, such as the drum into which waste is disposed and to which the lid is generally coupled. Further, the mounting assembly can be coupled to a suction system having a motor, rotatable impeller to create a suction, exhaust, controls and other components known to those with ordinary skill in the art. For clarity, the other portions of the vacuum cleaner are not illustrated in this figure.

A filter support assembly 26 is generally coupled to the mounting assembly 24. The filter support assembly includes one or more openings 28 to provide for the flow of air or other media downstream of the filter through the openings and into the mounting assembly 24 for vacuum and subsequent exhaust, as described herein. The filter support assembly can further include a centering step 62 for a corresponding recess in the filter cap 8 to slide over the centering step and assist in centering and retaining the filter to the filter support assembly.

A filter clamp 30 is rotationally coupled to the mounting assembly 24. In the embodiment shown, the filter clamp 30 includes a clamp ring 40 rotationally coupled to the mounting assembly 24 and an actuator 42 to rotate the clamp ring about an axis, such as the longitudinal axis 18. The term "ring" is used broadly and can include a continuous or discontinuous set of components. The actuator 42 can include a lever as shown, solenoid, stepper motor, and other manual, mechanical, electrical, hydraulic, or pneumatic actuator. In the embodiment shown, an opening 66, such as a slot, is formed in the mounting assembly 24 to conveniently allow the actuator 42 to rotate between first and second positions with built-in stops at each position. An optional floating seal 32 can be coupled to the filter clamp 30 that can be raised and lowered with the filter clamp and particularly the clamp ring 40 between different positions.

The mounting assembly 24 includes an undercut portion 34. The undercut portion is sized smaller in cross sectional dimension than an adjacent portion of the filter support assembly 26 to provide a location for the lateral seal portion 12 of the filter seal 6 to be relaxed into a reduced radial dimension after stretching over the filter support assembly. The clamp ring 40 and the optional floating seal 32 coupled thereto are disposed about the undercut portion and move longitudinally along its length between the first and second positions. The undercut portion 34 allows the seal 6 to move radially inward after stretching over the filter support assembly 26 and be compressed between opposing surfaces when the filter clamp is rotated to form a sealing engagement between the seal 6 and the mounting assembly 24. The lateral seal portion 12 of the seal 6 in the undercut portion can be pinched between opposing surfaces to effect a sealing engagement with the filter and the mounting assembly. Further, the floating seal 32 can include a seal surface 36, and the mounting assembly can include a mounting flange 38, such as on a portion of the filter support assembly 26. A change in distances between the seal surface 36 and the mounting flange 38 due to the longitudinal movement of the filter clamp causes the portion of the seal 6 in the undercut portion to be selectively compressed and released.

In operation, the filter clamp 30 can be rotated to a first position, such as an open position, shown in FIG. 3. The filter 2 can be placed over the filter support assembly 26 by stretching the seal 6 over the filter support assembly and pushing the filter toward the undercut portion 34. The seal 6 relaxes at least partially upon encountering the smaller cross section of the undercut portion 34 to protrude into the undercut portion. Meanwhile, the distal end of the filter with the cap 8 can engage the centering step 62 to assist in securing the filter to the mounting assembly.

The filter clamp 30 can be rotated to a second position such as a closed position, as shown in FIG. 4. The rotational movement to the closed position causes longitudinal movement of the filter clamp 30 toward the seal 6 and the flange 38 due to cams 44 below the filter clamp, described herein. The portion of the seal 6 disposed between the filter clamp 30 and the flange 38 is compressed or "pinched" therebetween, thus effecting a sealing engagement with the filter and mounting assembly. To release the filter, the filter clamp 30 is rotated to the first position and the clamp is lowered away from the flange 38, thus releasing the seal 6. The filter cap handle 10 is grasped and the filter is pulled off the filter support assembly by stretching the seal 6 over the filter support assembly. If there is a floating seal 32 with a seal surface 36 coupled to the filter clamp 30, the seal 6 is compressed between the seal surface 36 and the flange 38 when the filter clamp is rotated, so that it moves longitudinally toward the flange 38.

Figure 5:
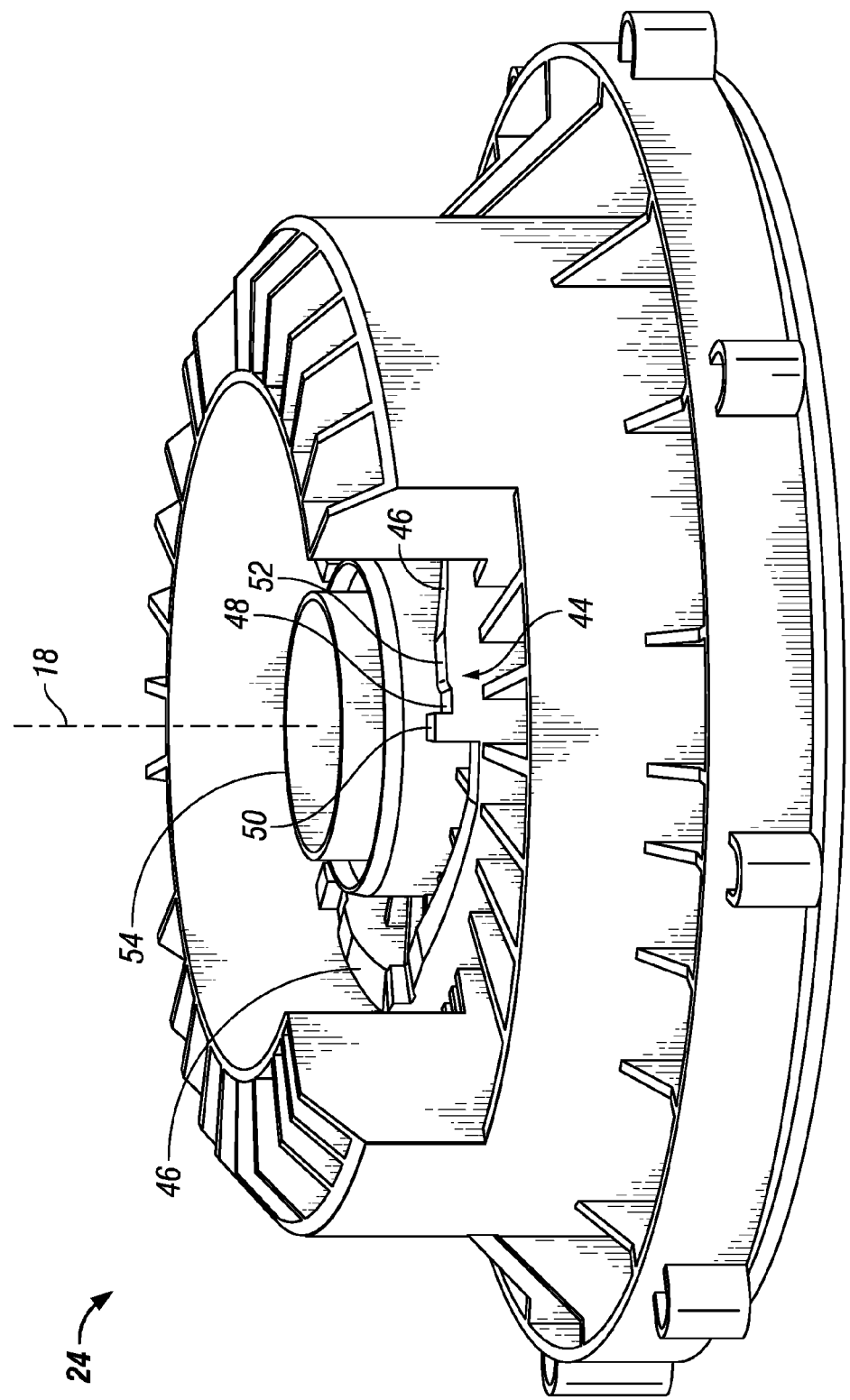
FIG. 5 is a perspective schematic view of cam details of the exemplary mounting assembly of the vacuum cleaner.

FIG. 5 is a perspective schematic view of cam details of the exemplary mounting assembly of the vacuum cleaner. The mounting assembly 24 includes one or more cams 44. The quantity of cams is variable, generally more than one, and, for example and without limitation, can be five in at least one embodiment. The cam 44 extends upward in the direction of the longitudinal axis 18 to cause longitudinal movement of the filter clamp 30. The cam 44 generally includes a sloped cam elevating surface 46. The elevating surface 46 cooperates with the filter clamp 30, shown in FIGS. 3-4, to raise and lower the filter clamp in the direction of the longitudinal axis 18, depending on the filter clamp position along the elevating surface. For example, as the filter clamp is rotated along the sloped elevating surface, the change in elevation causes the filter clamp to be raised along the longitudinal axis 18 to cause the clamping action on the seal 6, described herein. The cam 44 can further include a detent 48 at or near the top of the cam. The detent can be a lowered indention or raised step to assist in maintaining the clamping and keep the filter clamp from unintentionally loosening from a desired position. The cam can further include a cam stop 50 at an end of the cam to limit the amount of travel of the filter clamp. A cam neutral surface 52 between the cam stop 50 and the elevating surface 46 can provide a transition surface that neither raises or lowers the filter clamp.

The mounting assembly 24 can further include an inlet 54. Media, such as air, flows from the outside of the filter 2, shown in FIG. 1, through the filter element and then into the inlet 54 to inner components such as an impeller adjacent to the mounting assembly 24, and then is exhausted from the vacuum cleaner.

Figure 6:
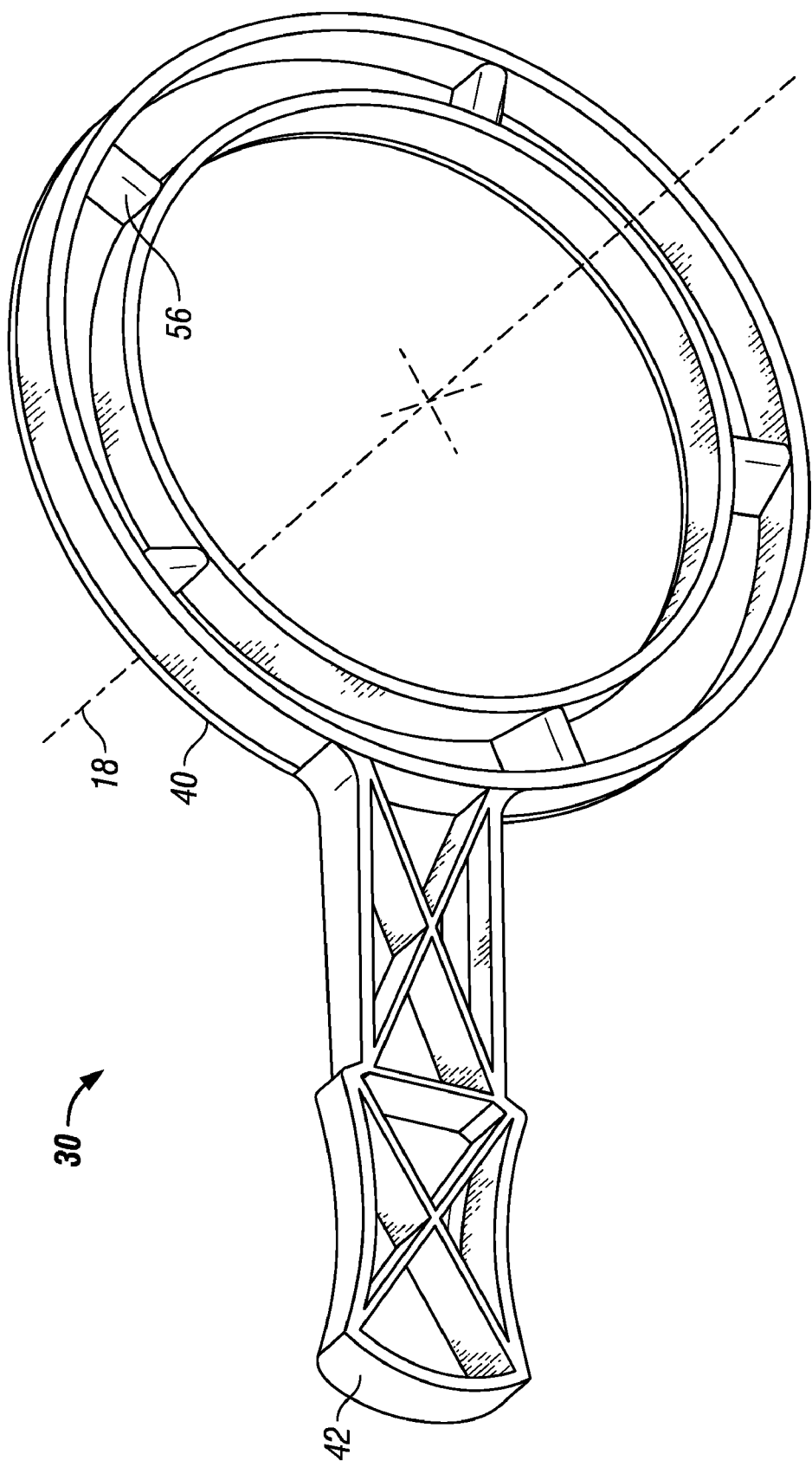
FIG. 6 is a perspective schematic bottom view of an exemplary filter clamp adapted to be coupled with the mounting assembly of FIG. 5.

FIG. 6 is a perspective schematic bottom view of an exemplary filter clamp coupled with the mounting assembly. The filter clamp 30 includes the clamp ring 40 and the clamp actuator 42, described above. The clamp ring 40 further includes one or more cam followers 56 dimensioned to correspond to the locations of the cams 44 on the mounting assembly 24, shown in FIG. 5. In general, each cam follower 56 engages its respective cam as the actuator 42 rotates the clamp ring 40 to raise and lower the filter clamp along the longitudinal axis 18.

Figure 7:
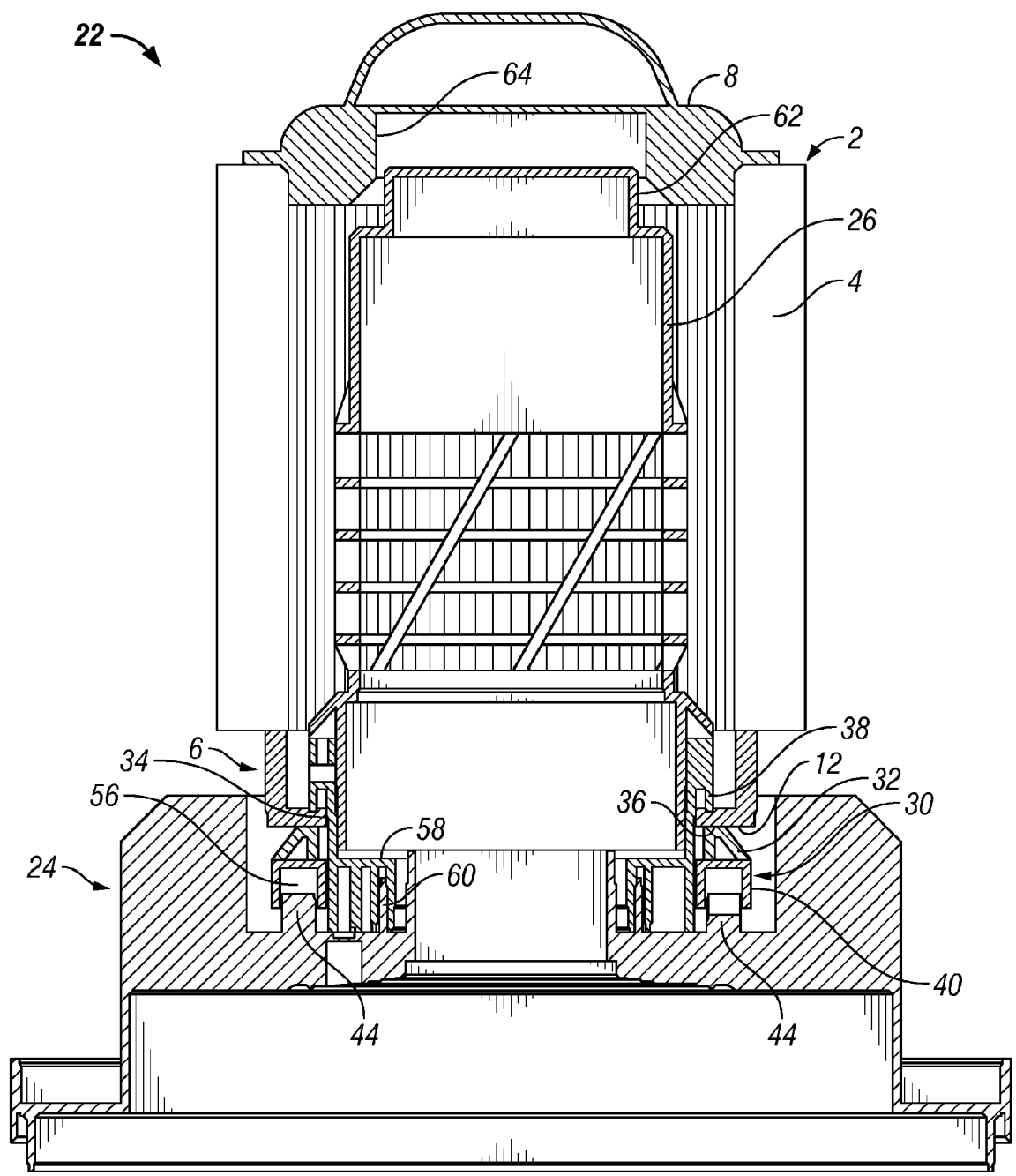
FIG. 7 is a cross sectional schematic view of the vacuum cleaner mounting assembly with the filter mounted thereto.

FIG. 7 is a cross sectional schematic view of the vacuum cleaner mounting assembly with the filter mounted thereto. The system 22 includes the mounting assembly 24 with the filter support assembly 26 coupled thereto. A filter 2 having a filter element 4 with a cap 8 on one end and a seal 6 on the other end is coupled to the filter support assembly 26. The seal 6 is disposed toward the end of the filter support assembly 26 proximal to the mounting assembly, so that the lateral seal portion 12 is longitudinally disposed in the undercut portion 34. The filter support assembly 26 can further support the cap 8 of the filter 2 by engagement of the cap recess 64 with the centering step 62 of the filter support assembly upon mounting.

A seal 58 can be disposed between the filter support assembly and the mounting assembly, such as at an interface 60 between the filter support assembly and the mounting assembly. The seal 58 can further be coupled as a separate or integral unit with the mounting flange 38 described above to assist in the longitudinal compression and sealing of the seal 6 in the clamping process.

The floating seal 32 can be coupled to the filter clamp 30 between the clamp ring 40 and the lateral seal portion 12 of the seal 6 to further assist in the longitudinal compression and sealing of the seal 6 in the clamping process. The filter clamp 30 is disposed above the cams 44. The cam follower 56 can engage the cam 44 to cause the filter clamp to raise and lower (relative to the figure) and selectively engage the lateral seal portion 12. While raising the filter clamp, the seal surface 36 of the optional floating seal 32 engages the lateral seal portion 12. Raising the clamp ring 40 further clamps the lateral seal portion 12 of the seal 6 between the seal surface 36 and the mounting flange 38.

Figure 8:
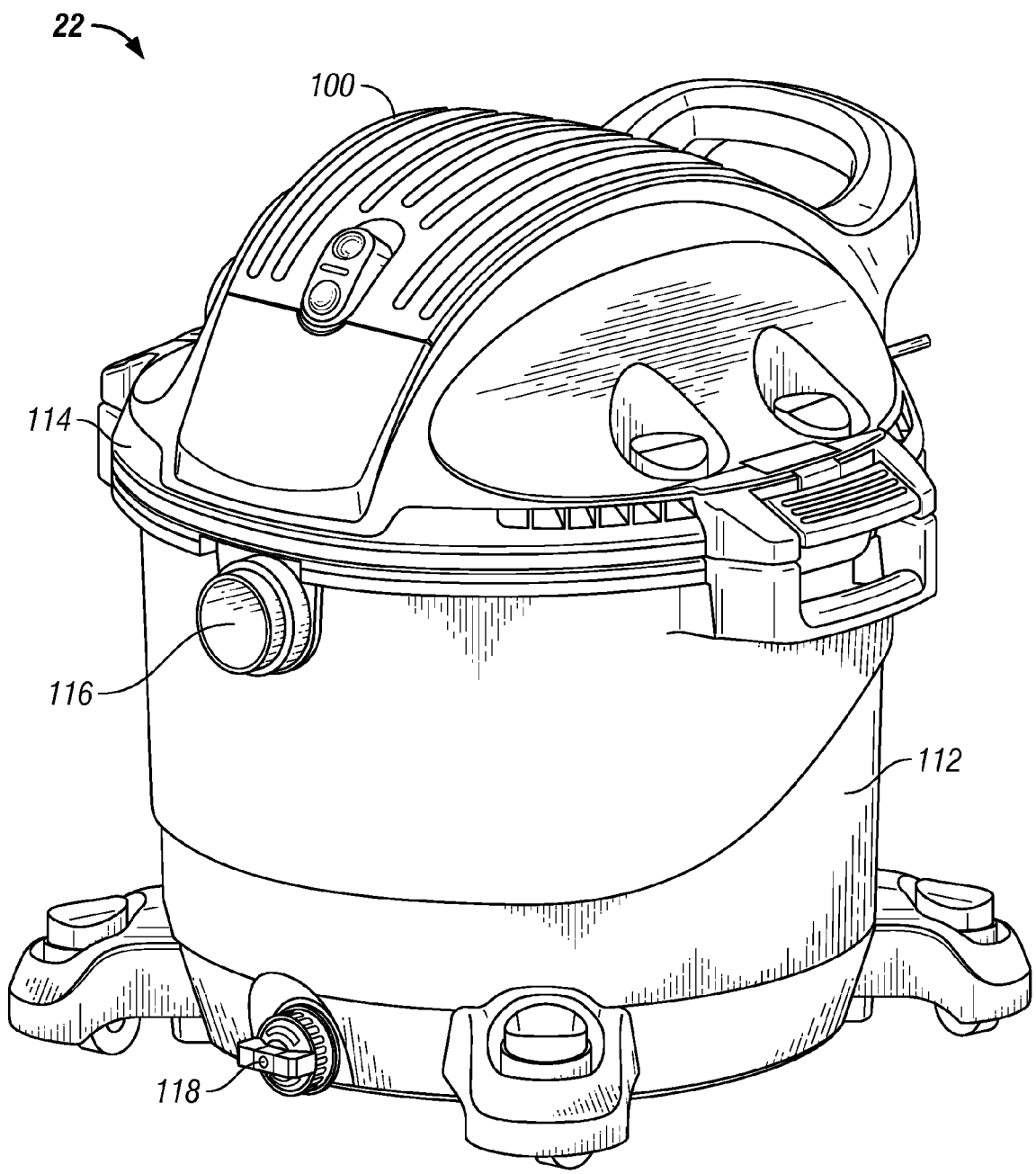
FIG. 8 is a schematic perspective view of an exemplary embodiment of the vacuum cleaner system.

FIG. 8 is a schematic perspective view of an exemplary embodiment of the vacuum cleaner system 22. The exemplary system shown in FIG. 8 is a wet/dry vacuum cleaner 100 that includes a collection drum 112 and a lid 114 removably attached to the collection drum 112 such that the lid 114 can be removed to empty debris or liquids contained therein. As with known wet/dry vacuums, a motor is generally coupled to the mounting assembly on the inside portion of the lid 114 of the vacuum cleaner 100, which is operable to create the vacuum inside the collection drum 112 to draw debris or liquid into the collection drum 112 through an inlet port 1 16. The collection drum further includes a drain 118 so that liquid can be emptied from the collection drum 112 without removing the lid 114. The vacuum cleaner 100 generally includes the mounting assembly 24, filter support assembly 26, and filter 2, described above, coupled to the underside of the lid 114.

The various steps described or claimed herein can be combined with other steps, can occur in a variety of sequences unless otherwise specifically limited, various steps can be interlineated with the stated steps, and the stated steps can be split into multiple steps. Unless the context requires otherwise, the word "comprise" or variations such as "comprises" or "comprising", should be understood to imply the inclusion of at least the stated element or step or group of elements or steps or equivalents thereof, and not the exclusion of any other element or step or group of elements or steps or equivalents thereof Also, any directions such as "top," "bottom," "left," "right," "upper," "lower," and other directions and orientations are described herein for clarity in reference to the figures and are not to be limiting of the actual device or system or use of the device or system. The device or system may be used in a number of directions and orientations.

The invention has been described in the context of preferred, and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant(s), but rather, in conformity with the patent laws, Applicant(s) intend to protect all such modifications and improvements to the full extent that such falls within the scope or range of equivalent of the following claims.

Further, any documents to which reference is made in the application for this patent as well as all references listed in any list of references filed with the application are hereby incorporated by reference. However, to the extent statements might be considered inconsistent with the patenting of this invention such statements are expressly not to be considered as made by the Applicant(s).

The invention claimed is:

1. A vacuum cleaner system, comprising:
   a mounting assembly of a vacuum cleaner;
   a filter support assembly adapted to be fixedly coupled to the mounting assembly; and
   a filter having a filter element and a lateral seal portion coupled to the filter element, the filter being removably coupled around at least a portion of the filter support assembly, and the lateral seal portion being oriented radially relative to a longitudinal axis of the filter, the lateral seal portion at least partially extending into an undercut area of the mounting assembly, the filter support assembly, or a combination thereof, the lateral seal portion being adapted to be compressed to seal the filter to the mounting assembly.

2. The system of claim 1, wherein the lateral seal portion is adapted to be compressed without compressing the filter element coupled thereto.

3. The system of claim 1, further comprising a filter clamp coupled to the mounting assembly.

4. The system of claim 3, wherein the filter clamp comprises a rotatable lever adapted to be moved along the longitudinal axis to compress and release the lateral seal portion.

5. The system of claim 3, further comprising a floating seal coupled to the filter clamp.

6. The system of claim 1, further comprising a seal adapted to seal an interface between the filter support assembly and the mounting assembly.

7. The system of claim 1, further comprising at least one cam coupled to the mounting assembly having a surface that changes elevation along the direction of the longitudinal axis.

8. The system of claim 7, further comprising a filter clamp coupled to the mounting assembly and dimensioned to engage the at least one cam to change an elevation of the filter clamp along the longitudinal axis.

9. The system of claim 1, wherein the filter further comprises a cap disposed distally from the seal when the seal is positioned in the undercut portion and dimensioned to at least partially engage a portion of the filter support assembly.

10. The system of claim 1, further comprising a vacuum cleaner drum and suction system coupled with the mounting assembly, the filter support assembly, and the filter.

11. A vacuum cleaner system, comprising:
   a mounting assembly having at least one cam with a sloped surface;
   a filter support assembly coupled to the mounting assembly;
   a rotatable filter clamp coupled to the mounting assembly and adapted to engage the at least one cam so that rotation of the filter clamp changes elevation of the filter clamp in conjunction with the sloped surface; and
   a filter having a filter element and a lateral seal portion coupled to the filter element, the filter being adapted to engage the filter support assembly, and the lateral seal portion being oriented radially relative to a longitudinal axis of the filter, the lateral seal portion at least partially extending into an undercut portion of the mounting assembly, the filter support assembly, or a combination thereof, the lateral seal portion being adapted to be compressed to seal the filter to the mounting assembly by the rotation of the filter clamp along the sloped surface with a corresponding change in elevation of the clamp.

12. The system of claim 11, wherein the lateral seal portion is adapted to be compressed without compressing the filter element coupled thereto.

13. A method of sealing a filter to a vacuum cleaner, the vacuum cleaner having a mounting assembly and a filter support assembly coupled to the mounting assembly, comprising:

placing the filter over the filter support assembly so that a lateral seal portion of the filter engages an undercut portion formed on the mounting assembly, the filter support assembly, or a combination thereof, wherein placing the filter over the filter support assembly comprises:

elastically stretching the lateral seal portion around the filter support assembly and sliding the filter toward an end of the filter support assembly to the undercut portion; and allowing the lateral seal portion to at least partially resume an unstretched position in the undercut portion; and rotating a filter clamp coupled to the mounting assembly along at least one cam surface to change the elevation of the filter clamp in a direction toward the lateral seal portion and compress the lateral seal portion disposed in the undercut portion.

14. The method of claim 13, further comprising compressing the lateral seal portion to cause sealing of the filter to the vacuum cleaner while avoiding substantially compressing a filter element of the filter coupled to the lateral seal portion.

15. The method of claim 13, further comprising releasing the lateral seal portion by rotating the filter clamp along the cam surface.

16. A vacuum cleaner system, comprising:
a mounting assembly having at least one cam with a sloped surface;
a filter support assembly coupled to the mounting assembly;
a rotatable filter clamp coupled to the mounting assembly and adapted to engage the at least one cam so that rotation of the filter clamp changes elevation of the filter clamp in conjunction with the sloped surface; and
a filter having a filter element and a lateral seal portion coupled to the filter element, the filler being adapted to seal to the mounting assembly by the rotation of the filter clamp along the sloped surface with a corresponding change in elevation of the clamp without compressing the filter element.

* * * * *